(12) United States Patent
Kim et al.

(10) Patent No.: US 10,205,843 B2
(45) Date of Patent: Feb. 12, 2019

(54) IMAGE FORMING APPARATUS AND METHOD FOR PROVIDING WORKFLOW SERVICE

(71) Applicant: S-Printing Solution Co., Ltd., Suwon-si, Gyeonggi-do (KR)

(72) Inventors: Jung-hun Kim, Suwon-si (KR); Hyeong-bae Yu, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/290,682

(22) Filed: Oct. 11, 2016

(65) Prior Publication Data

US 2017/0171413 A1    Jun. 15, 2017

(30) Foreign Application Priority Data

Dec. 11, 2015  (KR) .................. 10-2015-0177370

(51) Int. Cl.
*H04N 1/00* (2006.01)
*G06F 3/12* (2006.01)

(52) U.S. Cl.
CPC ....... *H04N 1/00949* (2013.01); *G06F 3/1275* (2013.01); *H04N 1/00015* (2013.01); *H04N 1/00042* (2013.01); *H04N 1/00344* (2013.01); *H04N 1/00962* (2013.01); *H04N 1/00973* (2013.01); *H04N 2201/0094* (2013.01)

(58) Field of Classification Search
CPC ........... H04N 1/00015; H04N 1/00042; H04N 1/00344; H04N 1/00949; H04N 1/00962; H04N 1/00973; G06F 3/1208; G06F 3/1275

USPC ..... 358/1.11–1.18, 1.9, 2.1, 400–404; 718/1, 718/100, 101–106; 709/201–203
See application file for complete search history.

(56) References Cited

U.S. PATENT DOCUMENTS

| | | | |
|---|---|---|---|
| 7,634,598 B2 | 12/2009 | Kim et al. | |
| 2002/0194245 A1* | 12/2002 | Simpson | G06F 9/5027 718/101 |
| 2004/0057065 A1* | 3/2004 | Michimura | G06F 9/50 358/1.13 |
| 2007/0133045 A1* | 6/2007 | Kubota | H04N 1/00416 358/1.15 |
| 2007/0136117 A1* | 6/2007 | Matsueda | G06Q 10/06 358/1.15 |
| 2010/0027057 A1* | 2/2010 | Fujisawa | H04N 1/00217 358/1.15 |
| 2013/0018803 A1* | 1/2013 | Challu | G06Q 10/06 705/304 |
| 2013/0163037 A1* | 6/2013 | Huster | G06F 3/1205 358/1.15 |
| 2013/0173324 A1 | 7/2013 | Lo et al. | |
| 2013/0230246 A1* | 9/2013 | Nuggehalli | G06Q 10/10 382/176 |

(Continued)

*Primary Examiner* — Chad Dickerson
(74) *Attorney, Agent, or Firm* — Jefferson IP Law, LLP

(57) ABSTRACT

A method by which an image forming apparatus provides a workflow service is provided. The method includes acquiring an execution request for a workflow of an image forming operation, determining whether conditions for executing the workflow are satisfied, according to the acquired execution request, and executing pre-stored functions corresponding to the workflow if it is determined that the conditions are satisfied.

13 Claims, 15 Drawing Sheets

(56) References Cited

U.S. PATENT DOCUMENTS

2016/0182747 A1* 6/2016 Zahoran ............ H04N 1/00408
358/474

* cited by examiner

IMAGE FORMING APPARATUS AND METHOD FOR PROVIDING WORKFLOW SERVICE

CROSS-REFERENCE TO RELATED APPLICATION(S)

This application claims the benefit under 35 U.S.C. § 119(a) of a Korean patent application filed on Dec. 11, 2015 in the Korean Intellectual Property Office and assigned Serial number 10-2015-0177370, the entire disclosure of which is hereby incorporated by reference.

TECHNICAL FIELD

The present disclosure relates to an image forming apparatus for providing a workflow service and a method by which the image forming apparatus provides the workflow service.

BACKGROUND

Types of image forming apparatuses include individual devices, such as printers, scanners, copy machines, and facsimiles and multi-function products (MFPs) in which various functions of different devices as described above are integrated in one device. Image forming apparatuses may include a user interface (UI) for a user to control an operation of an Image forming apparatus or to input data. Since functions provided by image forming apparatuses differ from each other according to types of the image forming apparatuses, types of UIs therein may differ from each other. Along with the development of scientific technology, hardware and software used for image forming apparatuses also have been significantly developed, and UIs of the image forming apparatuses also have evolved.

In addition, recently, image forming apparatuses may be connected to other user devices, such as mobile devices and laptop computers through a network by including a wired communication module, such as an Ethernet module or a wireless communication module, such as a Wi-Fi module, a Wi-Fi Direct module, a near field communication (NFC) module, a Bluetooth module, a Zigbee module, or an infrared data association (IrDA) module. In addition, image forming apparatuses may perform an operation of uploading or downloading information, such as a document to or from a cloud server by using the modules described above to access the cloud server.

In addition, image forming apparatuses may have various functions besides a print function. For example, the image forming apparatuses may have scan copy, facsimile, e-mail transfer, storage, character recognition, and file transfer protocol (FTP) functions, and the like.

Therefore, a need exists for an image forming apparatus that provides a complex of various functions to a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus for providing a workflow service and a method by which the image forming apparatus provides the workflow service.

Another aspect of the present disclosure is to provide a non-transitory computer-readable recording medium having recorded thereon a computer-readable program for executing the method in a computer.

Additional aspects will be set forth in part in the description which follows and, in part, will be apparent from the description, or may be learned by practice of the presented embodiments.

In accordance with an aspect of the present disclosure, a method by which an image forming apparatus provides a workflow service is provided. The method includes acquiring an execution request for a workflow of an image forming operation, determining whether conditions for executing the workflow are satisfied, according to the acquired execution request, and executing pre-stored functions corresponding to the workflow if it is determined that the conditions are satisfied.

The determining of whether the conditions for executing the workflow are satisfied may include determining whether input data required to execute the pre-stored functions corresponding to the workflow has been acquired.

The determining of whether the conditions for executing the workflow are satisfied may include determining whether any one other function of the pre-stored functions is completely executed in order to execute any one function of the pre-stored functions corresponding to the workflow.

The executing of the pre-stored functions corresponding to the workflow may include driving an agent for a first function corresponding to the workflow of the image forming operation and driving an agent for a second function corresponding to the workflow of the image forming operation by using an execution result of the first function.

The agent for the first function and the agent for the second function may communicate, by using a representational state transfer (REST) application programming interface (API), with external web service servers for executing the first function and the second function, respectively.

The driving of the agent for the first function may include requesting the external web service server to execute the first function, by using the REST API and receiving an execution result of the first function from the external web service server for executing the first function, and the driving of the agent for the second function may include requesting the external web service server to execute the second function based on the execution result of the first function, by using the REST API and receiving an execution result of the second function from the external web service server for executing the second function.

The acquiring of the execution request for the workflow of the image forming operation may include providing workflows of a plurality of image forming operations stored in the image forming apparatus to a user through a user interface (UI) of the image forming apparatus and acquiring a user input for selecting any one workflow to be executed from among the provided workflows of the plurality of image forming operations.

The providing of the workflows of the plurality of image forming operations stored in the image forming apparatus may include acquiring user identification information from the user, acquiring the workflows of the plurality of image forming operations corresponding to the acquired user identification information, and displaying the acquired workflows of the plurality of image forming operations on the UI of the image forming apparatus.

The acquiring of the execution request for the workflow of the image forming operation may include acquiring state information of the image forming apparatus by monitoring a state of the image forming apparatus and selecting a workflow of an image forming operation corresponding to the state information of the image forming apparatus.

In accordance with another aspect of the present disclosure, an image forming apparatus for providing a workflow service is provided. The image forming apparatus includes a controller configured to acquire an execution request for a workflow of an image forming operation and determine whether conditions for executing the workflow are satisfied, according to the acquired execution request, a storage configured to store the conditions for executing the workflow and information about pre-stored functions corresponding to the workflow, and an operation executor configured to execute the pre-stored functions corresponding to the workflow if it is determined that the conditions are satisfied.

The controller may be further configured to determine whether the conditions are satisfied by determining whether input data required to execute the pre-stored functions corresponding to the workflow has been acquired.

The controller may be further configured to determine whether the conditions are satisfied by determining whether any one other function of the pre-stored functions is completely executed in order to execute any one function of the pre-stored functions corresponding to the workflow.

The operation executor may include a first function agent configured to execute a first function corresponding to the workflow of the image forming operation and a second function agent configured to execute a second function corresponding to the workflow of the image forming operation by using an execution result of the first function, and the controller may be further configured to drive the second function agent based on the execution result of the first function.

The image forming apparatus may further include a communication interface configured to allow the first function agent and the second function agent to communicate, by using a REST API, with external web service servers for executing the first function and the second function, respectively.

The first function agent may be further configured to request the external web service server to execute the first function, by using the REST API, and receive an execution result of the first function from the external web service server for executing the first function, and the second function agent may be further configured to request the external web service server to execute the second function based on the received execution result of the first function, by using the REST API, and receive an execution result of the second function from the external web service server for executing the second function.

The image forming apparatus may further include a UI configured to provide workflows of a plurality of image forming operations stored in the image forming apparatus and acquire a user input for selecting any one workflow to be executed from among the provided workflows of the plurality of image forming operations.

The UI may be further configured to acquire user identification information from a user and display workflows of a plurality of image forming operations corresponding to the acquired user identification information.

The controller may be further configured to acquire state information of the image forming apparatus by monitoring a state of the image forming apparatus and acquire an execution request for a workflow of an image forming operation corresponding to the state information of the image forming apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
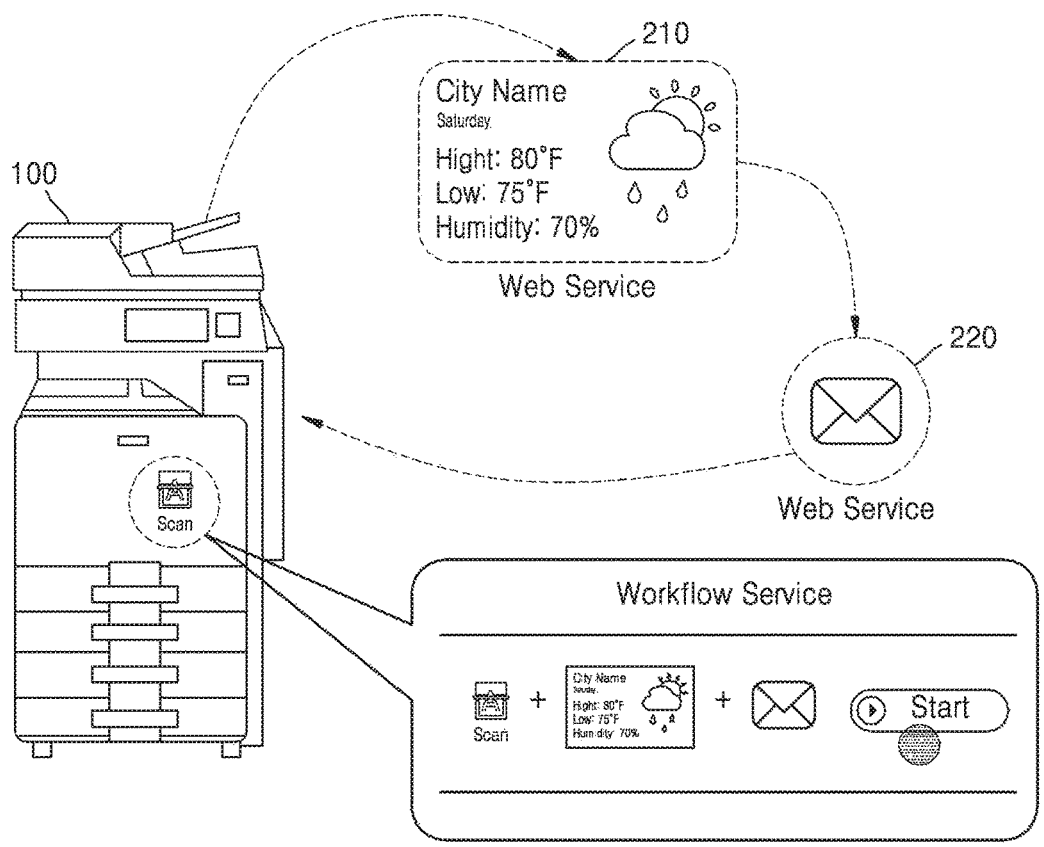
FIG. 1 illustrates a workflow service provided by an image forming apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, the inventive concept will be described with various embodiments for only examples with reference to the accompanying drawings. The various embodiments below are only to specify the inventive concept and are not to restrict or limit the right scope of the inventive concept. It is analyzed that those which could be readily inferred by those of ordinary skill in the art to which the inventive concept belongs from the detailed description and the various embodiments belong to the right scope of the inventive concept.

It should not be analyzed that the terms "is configured to" or "include" used in the specification necessarily include all of a plurality of components or a plurality of operations included in the specification, and it should be analyzed that some of the components or operations may not be included, or additional components or operations may be further included.

In addition, although terms, such as 'first' and 'second', can be used to describe various elements, the elements cannot be limited by the terms. The terms can be used only to classify a certain element from another element.

The various embodiments of the present disclosure below relate to a method and system for providing a cloud print server and a cloud server supporting the cloud print server, and a detailed description of the features well known to those of ordinary skill in the art to which the various embodiments belong is omitted.

FIG. 1 illustrates a workflow service provided by an image forming apparatus according to an embodiment of the present disclosure.

Referring to FIG. 1, an image forming apparatus 100 for providing the workflow service according to an embodiment of the present disclosure, is disclosed. A user may configure and manage a workflow of an image forming operation through a user interface (UI) of the image forming apparatus 100.

Herein, the workflow of the image forming operation indicates the definition of the contents and an execution order of the operation using a combination of various functions executable for image forming data. The various functions by which the workflow of the image forming operation is configured may include functions provided by the image forming apparatus 100 and web services executable for the image forming data.

For example, the functions provided by the image forming apparatus 100 may include a print function, a scan function, a copy function, a facsimile function, an e-mail transfer function, a storage function, a file transfer protocol (FTP) function, and the like. The web services are to provide various types of information to a user based on the Internet and may include, for example, cloud storage services, such as Dropbox, Gmail, Google Drive, and Ever Note, social network services, such as Instagram and Facebook, message services, security services, customer management services (voice of customer (VOC)), and the like.

The user may configure a workflow by combining various functions in a desired order through the UI. For example, the user may configure a first workflow by combining the scan function of the image forming apparatus 100, a weather information providing function of a web service server 210, and a mail transfer function of a web service server 220.

When an execution request for the first workflow is received from the user after configuring the first workflow, the image forming apparatus 100 may determine whether conditions for executing the first workflow are satisfied, according to the execution request. The conditions for executing the first workflow are necessary conditions which have to be satisfied to execute a workflow and may be, for example, conditions set by the user when the workflow is configured. Alternatively, conditions for executing a workflow may be conditions on whether input data of functions corresponding to a corresponding workflow has been acquired and whether the user has acquired use right of the corresponding workflow. Alternatively, conditions for executing a workflow may be conditions for executing functions corresponding to the workflow, and a condition for executing each of the functions may be a condition on whether another function supposed to be previously executed has been completed.

If it is determined that the conditions for executing the first workflow are satisfied, the image forming apparatus 100 may execute the first workflow. For example, the image forming apparatus 100 may scan a document to generate scan data and transmit information about a date or location when or where the document was scanned to the web service server 210 to acquire weather information about the scan data. The image forming apparatus 100 may add the acquired weather information to the scan data and transmit the scan data including the weather information to the web service server 220. The web service server 220 may transmit the scan data including the weather information to a preset address by means of a mail, and the image forming apparatus 100 may receive a transmission result of the mail and provide the received transmission result to the user.

The image forming apparatus 100 may directly acquire an execution request for a workflow from the user through the UI or acquire an execution request for a workflow by using state information of the image forming apparatus 100, which is acquired by periodically monitoring a state of the image forming apparatus 100. The state information of the image forming apparatus 100 is information indicating a current state of the image forming apparatus 100 and may indicate whether an error has occurred, whether consumables lack, whether power is turned on or off, and the like.

For example, the user may configure a workflow so as to correspond to state information of the image forming apparatus 100, and when pre-defined state information is acquired, the image forming apparatus 100 may determine that an execution request for a workflow corresponding to the acquired pre-defined state information is automatically acquired even without a request of the user and then execute the corresponding workflow.

As described above, the user may more quickly and easily use various functions than before by previously configuring various and complicated workflows using external web services and storing the configured workflows in the image forming apparatus 100. In addition, the image forming apparatus 100 may provide a list of selectable functions to the user through the UI such that the user easily configure and manage workflows.

Figure 2:
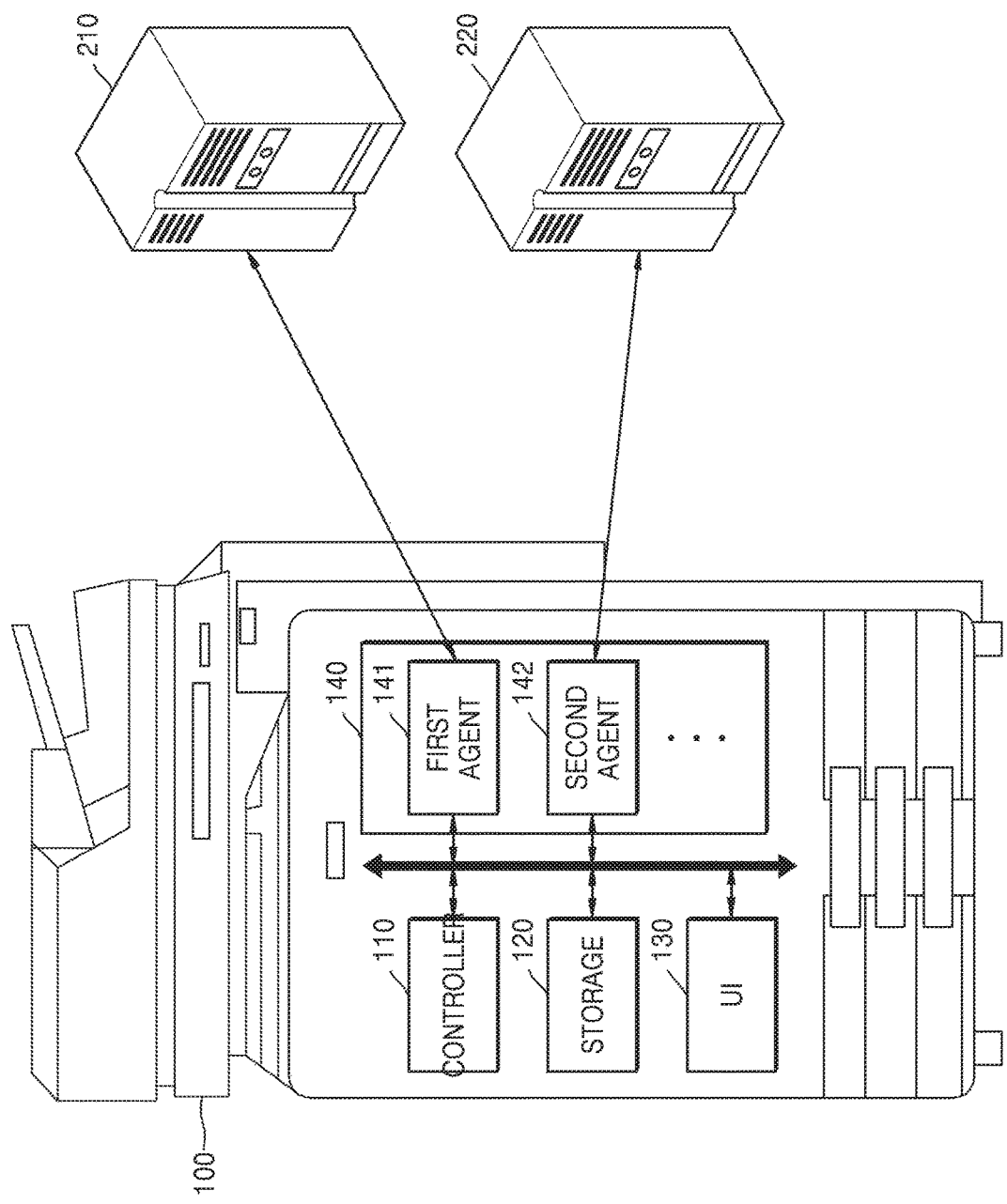
FIG. 2 is a block diagram illustrating a configuration of an image forming apparatus for providing a workflow service according to an embodiment of the present disclosure.

Hereinafter, a process of providing the workflow service is described with reference to FIG. 2 showing a block diagram of the image forming apparatus 100 for providing the workflow service according to an embodiment of the present disclosure.

FIG. 2 is a block diagram illustrating a configuration of an image forming apparatus for providing a workflow service according to an embodiment of the present disclosure.

Referring to FIG. 2, the image forming apparatus 100 may include a controller 110, a storage 120, a UI 130, and an operation executor 140. In FIG. 2, only components related to the present embodiment are described so as not to obscure the features of the present embodiment of the present disclosure. However, it will be understood by those of ordinary skill in the art that other general-use hardware components may be included besides the hardware components shown in FIG. 2.

According to an embodiment of the present disclosure, the controller 110 of the image forming apparatus 100 may include, for example a central processing unit (CPU) as a component for controlling a general operation of the image forming apparatus 100.

The controller 110 may acquire an execution request for a workflow of an image forming operation. For example, the controller 110 may acquire an execution request for a workflow from the user through the UI 130, or may acquire state information of the image forming apparatus 100 and automatically acquire an execution request for a workflow corresponding to the acquired state information.

The state information of the image forming apparatus 100 is information indicating a current state of the image forming apparatus 100 and may indicate whether an error has occurred, whether consumables lack, whether power is turned on or off, and the like, and the controller 110 may acquire state information of the image forming apparatus 100 by periodically monitoring a state of the image forming apparatus 100.

The controller 110 may determine whether conditions for executing the workflow are satisfied, according to the acquired execution request. The conditions for executing the workflow are necessary conditions which have to be satisfied to execute the workflow and may be, for example, conditions set by the user when the workflow of the image forming operation is configured. Alternatively, the conditions for executing the workflow may be conditions on whether input data of functions corresponding to the corresponding workflow has been acquired and whether the user has acquired use right of the corresponding workflow. Alternatively, the conditions for executing the workflow may be conditions for executing functions corresponding to the workflow, and a condition for executing each of the functions may be a condition on whether another function supposed to be previously executed has been completed.

When it is determined that the conditions for executing the workflow are satisfied, the controller 110 may execute pre-stored functions corresponding to the execution-requested workflow.

For example, a first workflow of an image forming operation may include a combination of two functions, i.e., a first function and a second function, corresponding to the first workflow. A workflow indicating the contents and an execution order of an operation using a combination of various functions may be previously configured and stored in the storage 120. A method of configuring a workflow of an image forming operation will be described later with reference to FIG. 3.

The controller 110 may determine the pre-stored functions corresponding to the execution-requested workflow with reference to the storage 120. For example, the controller 110 may determine the first function and the second function to be sequentially executed in correspondence with the execution-requested first workflow.

The controller 110 may transmit the execution request for the functions to the operation executor 140 to execute the determined functions. More particularly, the operation executor 140 may include a plurality of (e.g., first and second) agents 141 and 142 corresponding to the respective functions of the workflow, and the controller 110 may drive the plurality of agents 141 and 142 corresponding to the respective functions to execute the functions.

The operation executor 140 may be configured to execute the pre-stored functions corresponding to the workflow and may include a plurality of agents for executing a plurality of functions, respectively.

For example, the operation executor 140 may include the plurality of agents 141 and 142 corresponding to functions to be executed using external web services, respectively. For example, the operation executor 140 may include the first agent 141 corresponding to the first function provided by the web service server 210 and the second agent 142 corresponding to the second function provided by the web service server 220.

In addition, the plurality of agents may include a print interface (not shown), a scan interface (not shown), and the like, for executing functions to be executed by the image forming apparatus 100.

The first and second agents 141 and 142 may be driven by the controller 110 and communicate with the external web service servers 210 and 220 for respectively executing functions corresponding to the first and second agents 141 and 142, by using a representational state transfer (REST) application programming interface (API) during the driving. Alternatively, the first and second agents 141 and 142 may communicate with the external web service servers 210 and 220 for respectively executing functions corresponding to the first and second agents 141 and 142, through communication interfaces (not shown) of various schemes.

For example, when the controller 110 drives the first agent 141 to execute the first workflow, the first agent 141 may acquire an execution result of the first function from the web service server 210 by using the REST API and transmit the execution result of the first function to the controller 110.

The controller 110 may drive the second agent 142 by using the acquired execution result of the first function. The second agent 142 may acquire an execution result of the second function based on the execution result of the first function from the web service server 220 by using the REST API and transmit the execution result of the second function to the controller 110.

The controller 110 may determine whether all functions corresponding to the first workflow have been executed, with reference to the storage 120 and store the execution result of the second function in the storage 120. In addition, the controller 110 may provide the execution result of the second function to the user through the UI 130.

The storage 120 is configured to store various kinds of data to be used to provide the workflow service in the image forming apparatus 100 and may be implemented using, for example, a volatile memory, such as random access memory (RAM), a nonvolatile memory, such as read only memory (ROM), a hard disk drive (HDD), a solid state drive (SSD), and the like.

The storage 120 may store workflows of pre-configured image forming operations. For example, the storage 120 may store conditions for executing the workflows of the pre-configured image forming operations and information about the working contents and an execution order of functions constituting a workflow of each of the pre-configured image forming operations. In addition, the storage 120 may store workflows of image forming operations corresponding to user identification information that is the user's unique information.

In addition, the storage 120 may store execution results of workflows of image forming operations.

The UI 130 may be a hardware configuration having a role of providing information to the user and receiving an input from the user. The UI 130 may be implemented by a display having a display function, such as a monitor, a touchscreen, a liquid crystal display (LCD), or a light-emitting diode (LED), and an input device having an input function, such as a touch panel, a keyboard, a mouse, physical buttons, and the like.

The UI 130 may provide workflows of image forming operations, which are pre-stored in the storage 120, and acquire a user input for selecting a workflow to be executed from the user. The UI 130 may provide the workflows of the image forming operations corresponding to the user identification information. The UI 130 may transmit the acquired user input to the controller 110.

Figure 3:
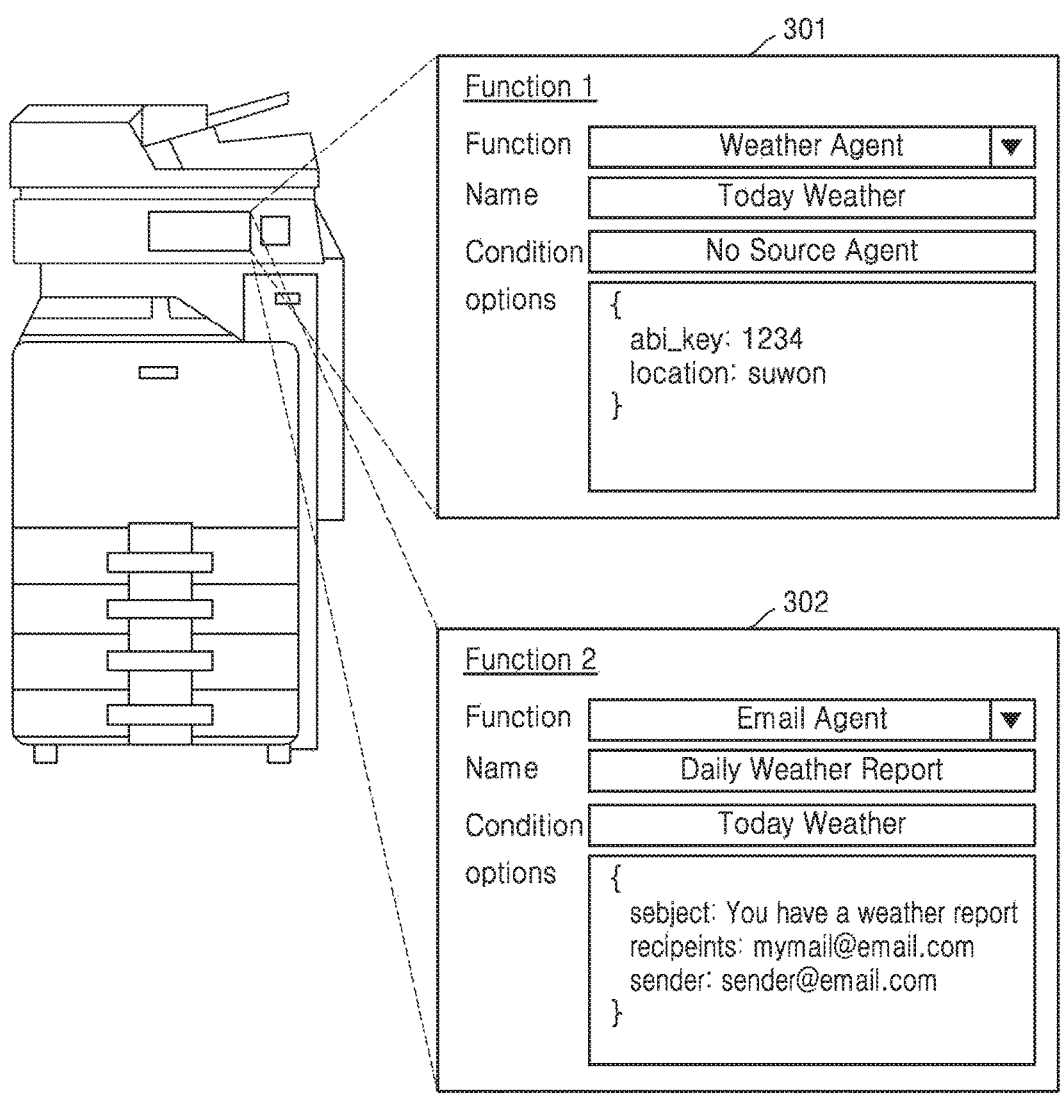
FIG. 3 illustrates a process of configuring a workflow of an image forming operation in an image forming apparatus according to an embodiment of the present disclosure.

FIG. 3 illustrates a process of configuring a workflow of an image forming operation in an image forming apparatus according to an embodiment of the present disclosure.

Referring to FIG. 3, the user may configure a workflow of an image forming operation by using a UI of the image forming apparatus 100 to receive the workflow service.

For example, the user may select a first function 301 and a second function 302 by using the UI and create a first workflow consisting of the first function 301 and the second function 302.

The image forming apparatus 100 may provide a list of selectable functions to the user through the UI and drive an agent for a function selected by the user. For example, when the user selects the first function 301, the image forming apparatus 100 may drive an agent for the first function 301 to provide a configuration screen image such that the user configures information about the first function 301. For example, the agent for the first function 301 may receive items of input data and information required to execute the first function 301 from an external web service server for executing the first function 301 and may provide the received items to the user.

Referring to FIG. 3, a configuration screen image for the first function 301 and a configuration screen image for the second function 302 are shown. For example, the first function 301 selected by the user may be a weather information providing function and may be executed using an external web service of providing weather information. The user may set a condition for executing the first function 301. In this case, the user may set no condition such that no other condition is necessary except for an execution request for a workflow. In addition, when authentication is needed to execute the first function 301, the user may set authentication information, such as an API_key. In addition, the user may set location information when weather information of a specific region is desired.

In addition, the second function 302 selected by the user may be a mail transfer function and may be executed using an external web service of sending a mail. The user may set a condition for executing the second function 302 to execution completion of the first function 301. For example, the user may configure a workflow such that the first function 301 and the second function 302 are consecutively executed and may configure a workflow of executing the second function 302 based on the first function 301 such that weather information of 8 o'clock in every morning is sent through a mail. In addition, the user may set a title, a sender address, a recipient address, and the like, for a mail transfer, which are required to execute the second function 302.

The user may easily use various functions to be executed in the inside and the outside of the image forming apparatus 100 by configuring a workflow of an image forming operation through a combination of the various functions. The image forming apparatus 100 may store the configured workflow of the image forming operation. The image forming apparatus 100 may store workflows of image forming operations for each user and may further store whether the workflows of the image forming operations are activated.

Figure 4:
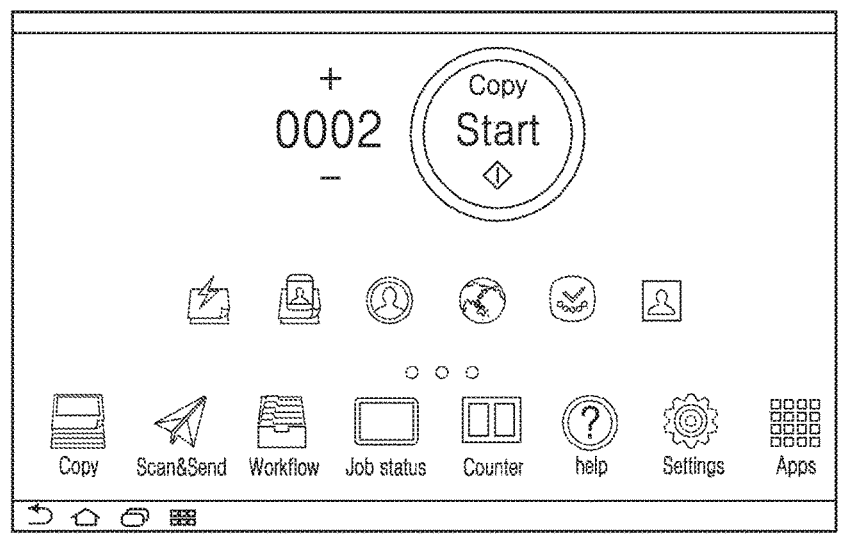
FIGS. 4 and 5 illustrate a process of using a workflow service in an image forming apparatus according to an embodiment of the present disclosure.
Figure 5:

FIGS. 4 and 5 illustrate a process of using a workflow service in an image forming apparatus according to an embodiment of the present disclosure.

Referring to FIG. 4, according to an embodiment of the present disclosure, the image forming apparatus 100 may provide a UI screen image 400 to the user to provide the workflow service. The user may execute various image forming operations by using the UI screen image 400.

More particularly, the user may click a "Workflow" icon on the UI screen image 400 to use pre-stored various workflows. When the user clicks the "Workflow" icon on the UI screen image 400, the image forming apparatus 100 may provide a UI screen image 500 of FIG. 5, which includes a list of pre-stored workflows of image forming operations.

Referring to FIG. 5, the image forming apparatus 100 may provide the stored workflows to the user by displaying the stored workflows. For example, the image forming apparatus 100 may display information about a name, activation/deactivation, a configured date and time of each workflow as the list.

In addition, the image forming apparatus 100 may selectively display usable workflows according to the user's identification information among the stored workflows. For example, the image forming apparatus 100 may display the usable workflows in an activation state according to the user's identification information.

The user may select any one of the workflows displayed in the list and execute the selected workflow. The image forming apparatus 100 may sequentially execute functions included in the selected workflow. More particularly, the image forming apparatus 100 may execute the workflow by sequentially driving respective agents for executing the functions included in the workflow.

Figure 6:
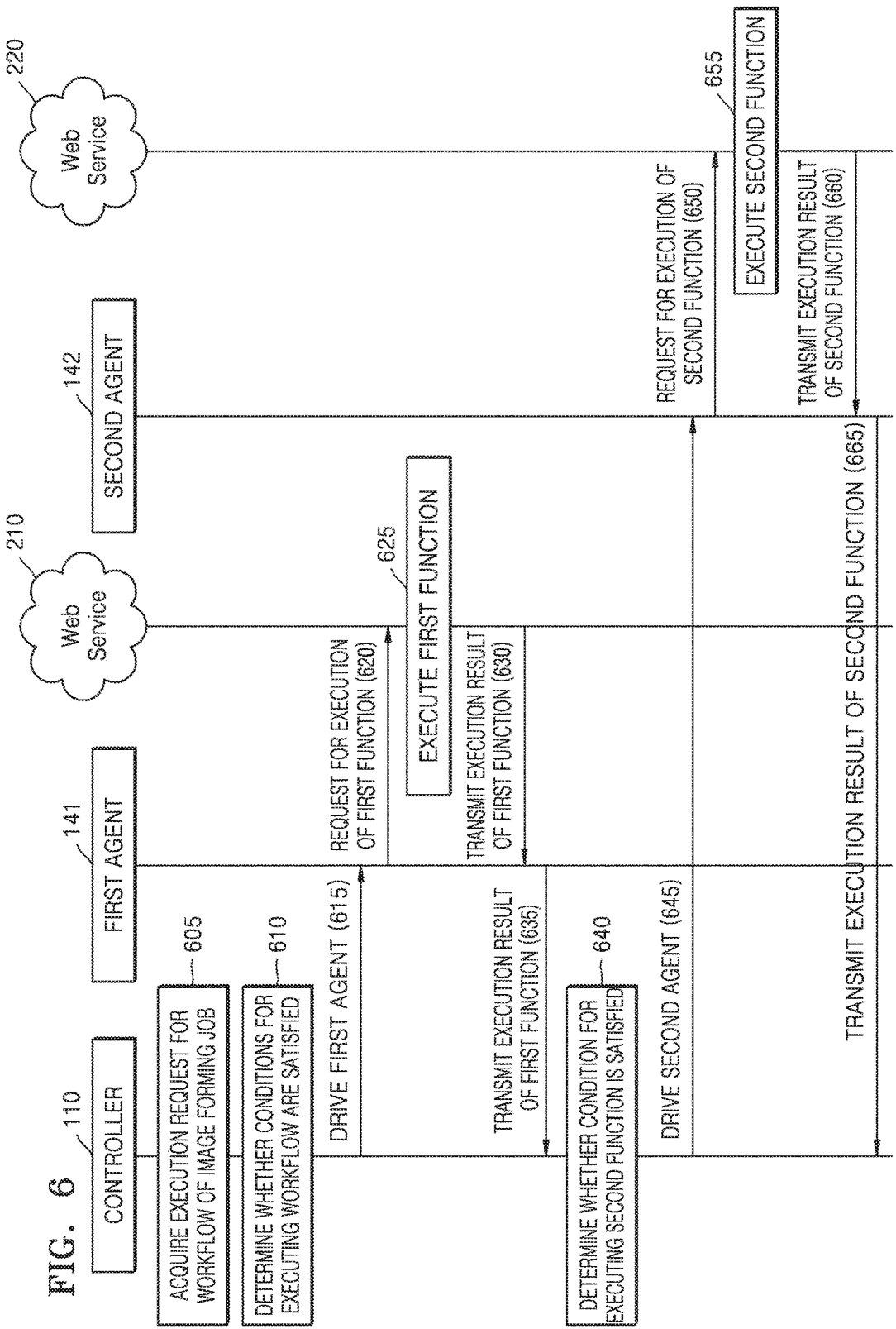
FIG. 6 is a signaling diagram illustrating a method by which an image forming apparatus provides a workflow service according to an embodiment of the present disclosure.

FIG. 6 is a signaling diagram illustrating a method by which an image forming apparatus provides a workflow service according to an embodiment of the present disclosure.

Referring to FIG. 6, a process of a method by which the image forming apparatus 100 of FIG. 2 provides the workflow service is illustrated.

In operation 605, the controller 110 may acquire an execution request for a workflow of an image forming operation. For example, the controller 110 may acquire an execution request for a first workflow from the user through the UI 130 of the image forming apparatus 100. According to an embodiment of the present disclosure, the first workflow may include a combination of a first function and a second function. Alternatively, the controller 110 may acquire state information of the image forming apparatus 100 and automatically acquire an execution request for the first workflow corresponding to the acquired state information.

The state information of the image forming apparatus 100 is information indicating a current state of the image forming apparatus 100 and may indicate whether an error has occurred, whether consumables lack, whether power is turned on or off, and the like, and the controller 110 may acquire state information of the image forming apparatus 100 by periodically monitoring a state of the image forming apparatus 100.

In operation 610, the controller 110 may determine whether conditions for executing the workflow are satisfied, according to the acquired execution request. The conditions for executing the workflow are necessary conditions which have to be satisfied to execute the workflow and may be, for example, conditions set by the user when the workflow of the image forming operation is configured. Alternatively, the conditions for executing the workflow may be conditions on whether input data of functions corresponding to the corresponding workflow has been acquired and whether the user has acquired use right of the corresponding workflow. Alternatively, the conditions for executing the workflow may be conditions for executing functions corresponding to the workflow, and a condition for executing each of the functions may be a condition on whether another function supposed to be previously executed has been completed.

The controller 110 may determine whether a condition for executing the first function is satisfied, to execute the first workflow. For example, when the first function is a function of providing weather information of a current location, the condition for executing the first function may be whether information about the current location of the image forming apparatus 100 has been acquired.

In operation 615, if it is determined that the condition for executing the first function is satisfied, the controller 110 may drive the first agent 141 corresponding to the first function. For example, when the information about the current location of the image forming apparatus 100 is acquired, the controller 110 may drive the first agent 141 and transmit the information about the current location of the image forming apparatus 100 to the first agent 141.

In operation 620, the first agent 141 may transmit an execution request for the first function to the external web service server 210 for executing the first function, by using the REST API. In this case, the first agent 141 may transmit input data necessary to execute the first function, which has been received from the controller 110, to the external web service server 210 together with the execution request for the first function. For example, when the first function is a weather information providing function, the first agent 141 may provide the information about the current location of the image forming apparatus 100 to the external web service server 210 to receive whether information of the current location.

In operation 625, the external web service server 210 may execute the first function.

In operation 630, the first agent 141 may receive an execution result of the first function from the external web service server 210, and in operation 635, the first agent 141 may transmit the received execution result of the first function to the controller 110.

When receiving the execution result of the first function, the controller 110 may store the received execution result of the first function in the image forming apparatus 100 and determine the second function to be subsequently executed after the first function with reference to the first workflow.

In operation 640, the controller 110 may determine whether a condition for executing the second function is satisfied, to execute the first workflow. For example, the condition for executing the second function may be whether the first function is completely executed.

In operation 645, if it is determined that the condition for executing the second function is satisfied, the controller 110 may drive the second agent 142 corresponding to the second function. For example, when the execution result of the first function is acquired, the controller 110 may drive the second agent 142 and transmit the weather information that is the execution result of the first function to the second agent 142.

In operation 650, the second agent 142 may transmit an execution request for the second function to the external web service server 220 for executing the second function, by using the REST API. In this case, the second agent 142 may transmit the execution result of the first function, which has been received from the controller 110, to the external web service server 220 together with the execution request for the second function. For example, when the execution result of the first function is weather information of the current location of the image forming apparatus 100, the second agent 142 may transmit the weather information to the external web service server 220 together with the execution request for the second function. In operation 655, the external web service server 220 may execute the second function. For example, the external web service server 220 for executing a mail transfer function that is the second function may send a mail including the received weather information of the current location of the image forming apparatus 100 to a preset recipient address.

In operation 660, the second agent 142 may receive an execution result of the second function from the external web service server 220, and in operation 665, the second agent 142 may transmit the received execution result of the second function to the controller 110.

The controller 110 may receive the execution result of the second function and provide the received execution result of the second function to the user. For example, the controller 110 may display whether the first workflow is completely executed, through the UI 130.

Figure 7:
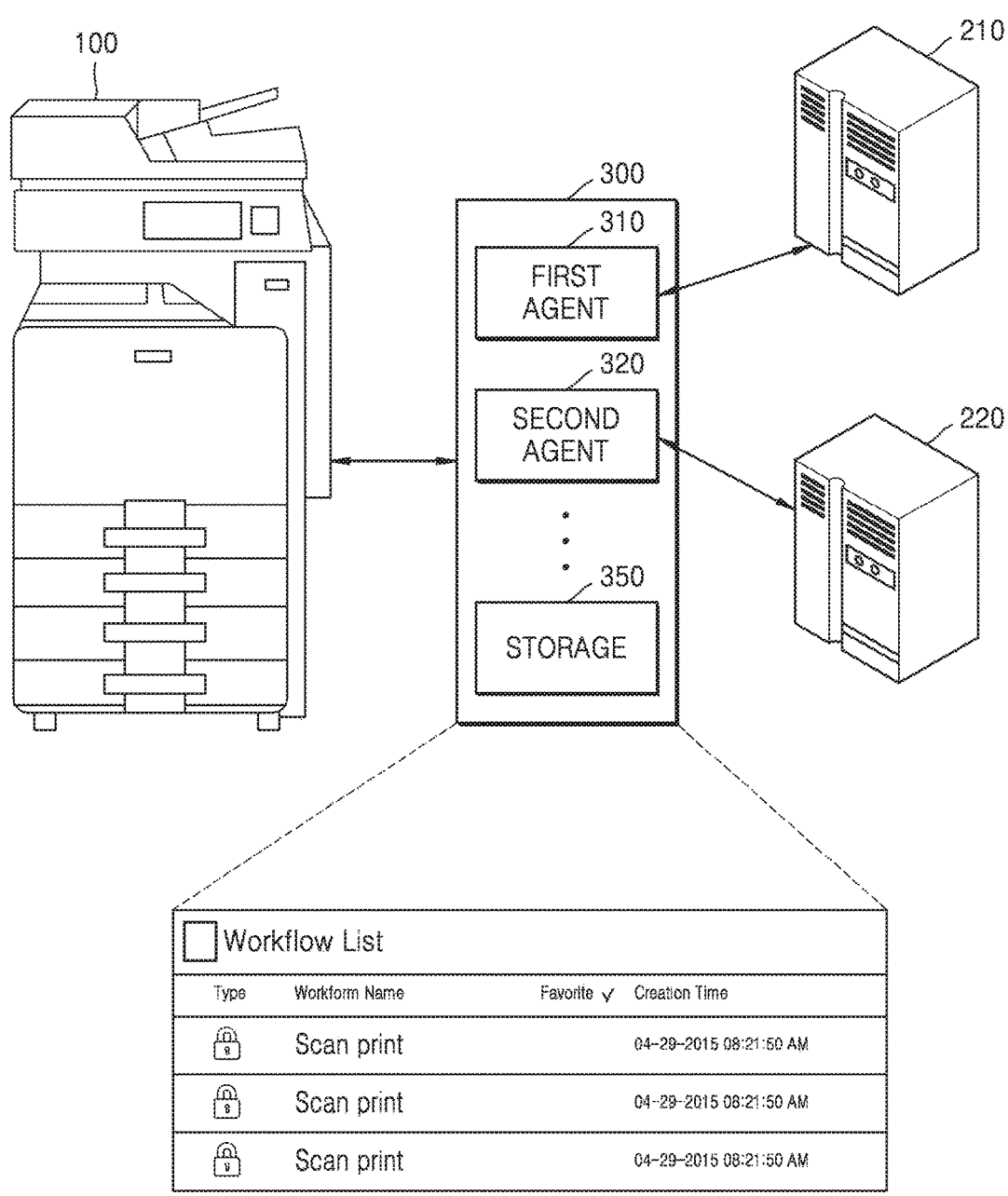
FIGS. 7 and 8 illustrate a method by which an image forming apparatus provides a workflow service according to an embodiment of the present disclosure.
Figure 8:
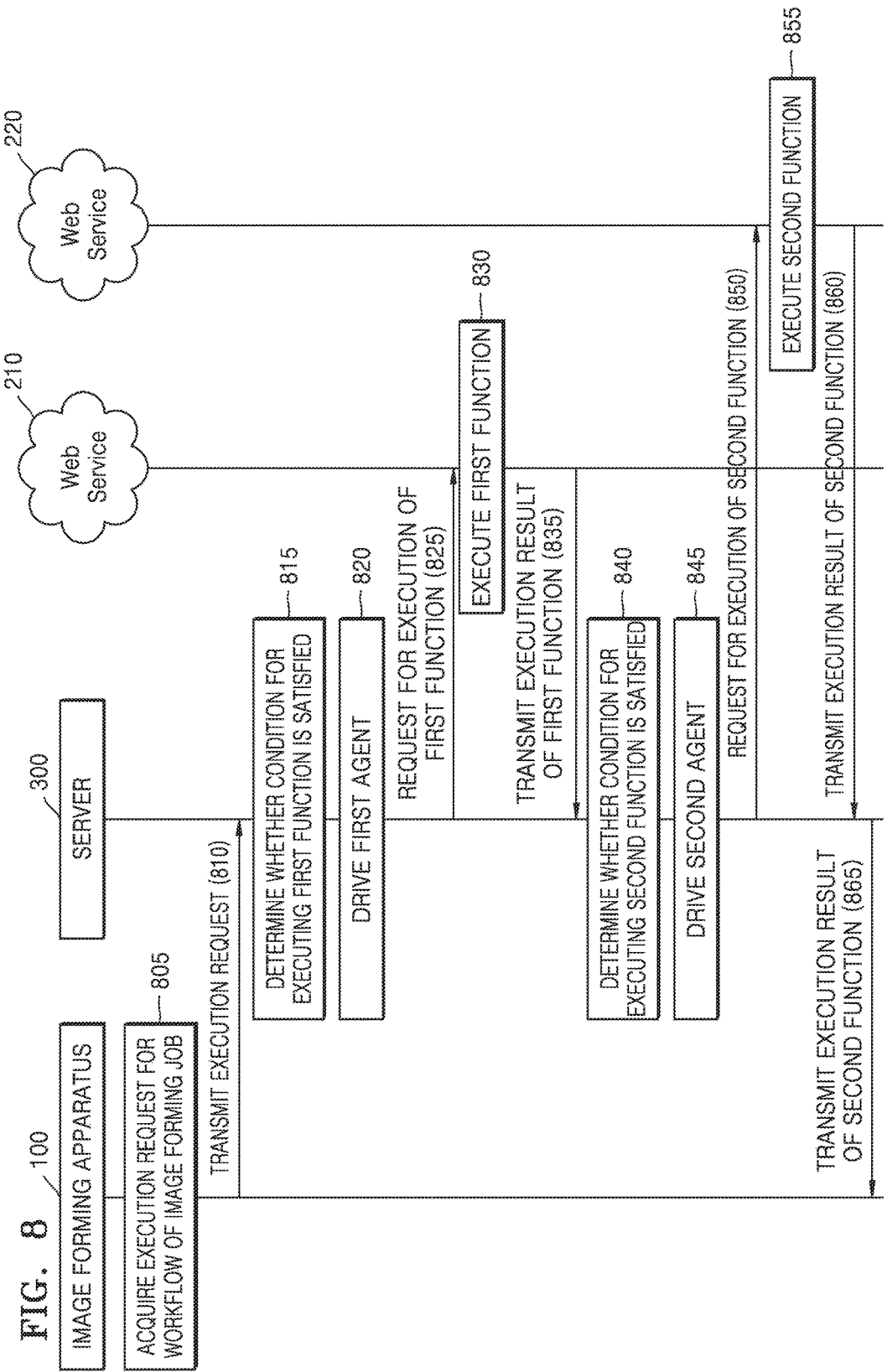

FIGS. 7 and 8 illustrate a method by which an image forming apparatus provides a workflow service according to an embodiment of the present disclosure.

Referring to FIG. 7, according to an embodiment of the present disclosure, the image forming apparatus 100 may transmit and receive information to and from a server 300 for storing, executing, and managing workflows of image forming operations, to provide the workflow service.

More particularly, according to an embodiment of the present disclosure, the image forming apparatus 100 may transmit an execution request for a workflow of an image forming operation or state information of the image forming apparatus 100.

The image forming apparatus 100 may acquire an execution request for a workflow from a user through a UI or acquire state information of the image forming apparatus 100 by periodically monitoring a state of the image forming apparatus 100.

According to an embodiment of the present disclosure, the server 300 may include a storage 350 configured to store various kinds of data for providing the workflow service and a plurality of (e.g., first and second) agents 310 and 320 corresponding to functions forming a workflow, which are configured to execute the functions, respectively.

The storage 350 may be implemented using, for example, a volatile memory, such as RAM, a nonvolatile memory, such as ROM, an HDD, or an SSD.

The storage 350 may store workflows of pre-configured image forming operations. For example, when the user configures a workflow on the image forming apparatus 100, the server 300 may receive the workflow from the image forming apparatus 100 and store in the storage 350.

The storage 350 may store conditions for executing the workflows of the pre-configured image forming operations and information about the working contents and an execution order of functions constituting a workflow of each of the pre-configured image forming operations. In addition, the storage 350 may store workflows of image forming operations corresponding to user identification information that is the user's unique information.

In addition, the storage 350 may store execution results of workflows of image forming operations.

When an execution request for a workflow of an image forming operation or state information of the image forming apparatus 100 is received from the image forming apparatus 100, the server 300 may drive the first agent 310 to execute a first function by referring to a workflow corresponding to the received execution request or state information from the storage 350. The driven first agent 310 may acquire an execution result of the first function from the web service server 210 by using the REST API.

When the execution result of the first function is acquired, the server 300 may drive the second agent 320 to execute a second function based on the execution result of the first function. The driven second agent 320 may acquire an execution result of the second function from the web service server 210 by using the REST API. The server 300 may store the acquired execution result of the second function in the storage 350 or transmit the acquired execution result of the second function to the image forming apparatus 100 to provide the acquired execution result of the second function to the user.

The server 300 may further include a controller (not shown) configured to control a general operation of all components of the server 300.

According to an embodiment of the present disclosure, the image forming apparatus 100 may separately use the server 300 to manage storing and execution of workflows of image forming operations, thereby providing an organic workflow service to users using a plurality of image forming apparatuses and increasing the performance of the image forming apparatus 100 and the usability of a storage space.

FIG. 8 is a signaling diagram of a method by which an image forming apparatus provides a workflow service according to an embodiment of the present disclosure.

Referring to FIG. 8, in operation 805, the image forming apparatus 100 may acquire an execution request for a workflow of an image forming operation, and in operation 810, the image forming apparatus 100 may transmit the acquired execution request to the server 300.

Alternatively, the image forming apparatus 100 may monitor a state of the image forming apparatus 100 and transmit acquired state information to the server 300.

When the execution request for the workflow or the state information of the image forming apparatus 100 is received, the server 300 may execute a corresponding workflow by referring to a workflow corresponding to the execution request or the state information. The server 300 may store information including conditions and functions for executing the workflow. In operation 815, the server 300 may determine whether a condition for executing a first function is satisfied, to execute the first function corresponding to the corresponding workflow.

In operation 820, if it is determined that the condition for executing the first function is satisfied, the server 300 may drive the first agent 310 corresponding to the first function, and in operation 825, the driven first agent 310 may transmit an execution request for the first function to the external web service server 210 for executing the first function, by using the REST API. In this case, the first agent 310 may transmit input data necessary to execute the first function, which has been received from the image forming apparatus 100, to the external web service server 210 together with the execution request for the first function.

In operation 830, the first function is executed, and in operation 835, the server 300 may receive an execution result of the first function from the external web service server 210. The server 300 may determine a second function to be subsequently executed after the first function with reference to the workflow.

In operation 840, the server 300 may determine whether a condition for executing the second function is satisfied, to execute the workflow. In operation 845, if it is determined that the condition for executing the second function is satisfied, the server 300 may drive the second agent 320 corresponding to the second function. In operation 850, the driven second agent 320 may transmit an execution request for the second function to the external web service server 220 for executing the second function, by using the REST API. In this case, the second agent 320 may transmit the execution result of the first function, which has been received from the first agent 310, to the external web service server 220 together with the execution request for the second function.

In operation 855, the external web service server 220 may execute the second function.

In operation 860, the server 300 may receive an execution result of the second function from the external web service server 220, and in operation 855, if it is determined that the workflow is completely executed, the server 300 may transmit the received execution result of the second function to the image forming apparatus 100.

The image forming apparatus 100 may provide the received execution result of the second function to the user through the UI of the image forming apparatus 100.

Figure 9:
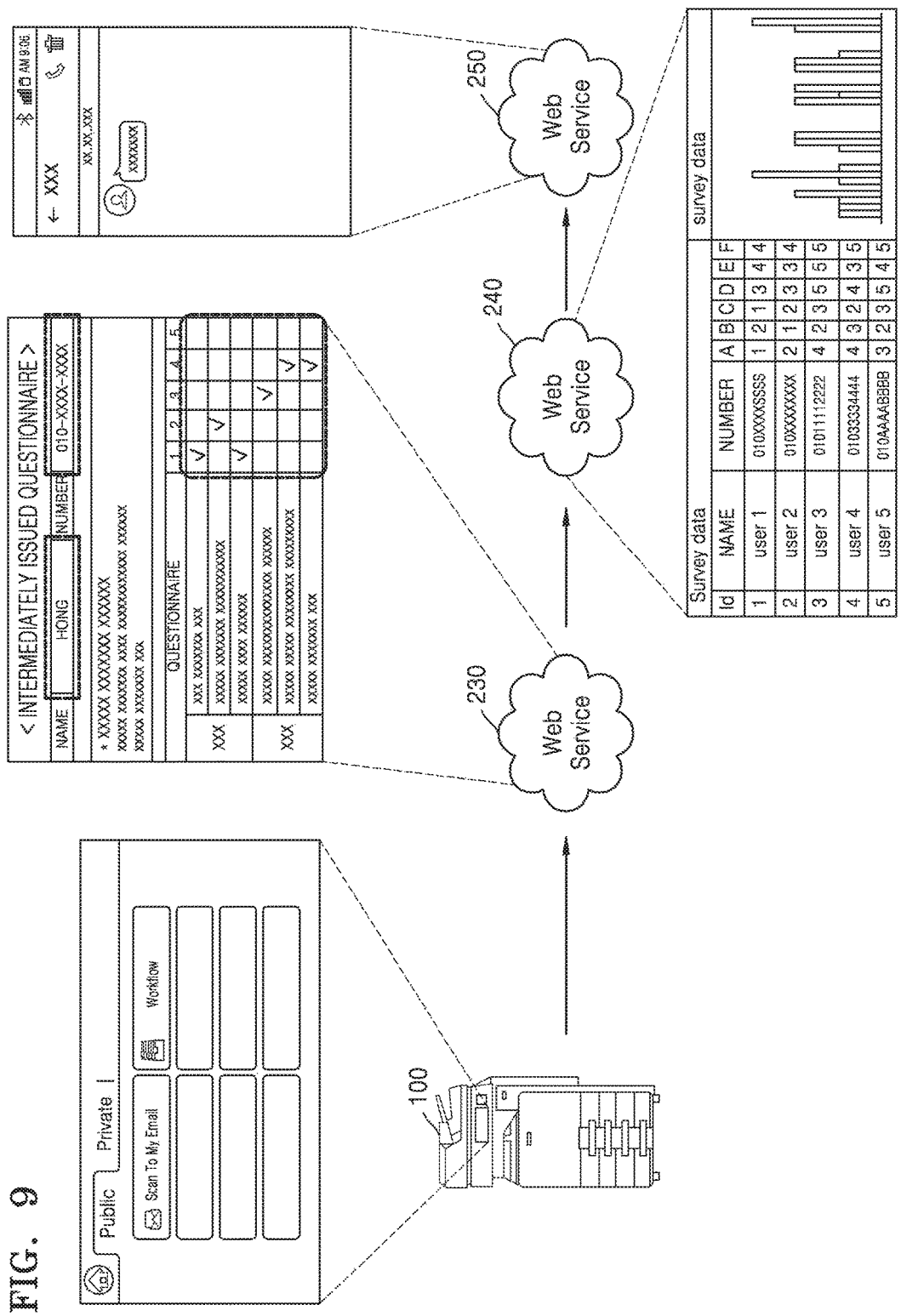
FIG. 9 illustrates a method by which an image forming apparatus provides a workflow service according to an embodiment of the present disclosure.

FIG. 9 illustrates a method by which an image forming apparatus provides a workflow service according to an embodiment of the present disclosure.

Referring to FIG. 9, the method of providing the workflow service, according to the embodiment of FIG. 9, may be performed by the image forming apparatus 100 of FIG. 1.

According to an embodiment of the present disclosure, the image forming apparatus 100 may provide the workflow service and functions of executing various image forming operations to a user. More particularly, the image forming apparatus 100 may provide a list of usable workflows to the user through a UI and execute a workflow selected by the user such that a plurality of functions are sequentially executed.

In this case, a workflow of an image forming operation indicates the definition of the contents and an execution order of the operation using a combination of various functions executable for image forming data. The various functions by which the workflow of the image forming operation is configured may include functions provided by the image forming apparatus 100 and web services executable for the image forming data.

A workflow of an image forming operation may include one or more functions but is not limited thereto and may include a combination of a number of functions. For example, the user may configure a first workflow consisting of four functions by combining a scan function, a character recognition service, a data analysis service, and a message transmission service.

According to an embodiment of the present disclosure, the image forming apparatus 100 may provide a list of usable workflows to the user through the UI and acquire an execution request for the first workflow from the user.

The image forming apparatus 100 may determine whether a document to be scanned is prepared, to execute the scan function that is a first function. If the document to be scanned is prepared, the image forming apparatus 100 may determine that a pre-defined condition corresponding to the first function is satisfied, and generate scan data by scanning the document. For example, the image forming apparatus 100 may generate scan data by scanning a questionnaire prepared by the user.

If the scan function that is the first function is completely executed, the image forming apparatus 100 may determine that a pre-defined condition corresponding to a second function is satisfied, and execute the second function based on the scan data that is an execution result of the first function. The image forming apparatus 100 may drive an agent corresponding to a character recognition function to execute the character recognition function that is the second function. In this case, the second function may be configured such that the character recognition function is executed on the scan data with respect to a certain region of the document. For example, the character recognition function may be executed on the certain region of the questionnaire with respect to the scan data obtained by scanning the questionnaire. The certain region may include, for example, a region in which information about a respondent is filled and a region in which a response to the questionnaire is filled.

The driven agent corresponding to the character recognition function may receive a character recognition result of the scan data from a web service server 230 for providing the character recognition service. For example, the agent for the character recognition function may request the web service server 230 to execute the character recognition function by transmitting the scan data to the web service server 230, and the web service server 230 may convert an image of the scan data into characters. The image forming apparatus 100 may receive converted scan data that is an execution result of the second function from the web service server 230. For example, the converted scan data that is the execution result of the second function may include the information about the respondent and information about the response to the questionnaire.

If the character recognition function that is the second function is completely executed, the image forming apparatus 100 may execute a third function based on the converted scan data that is the execution result of the second function. The image forming apparatus 100 may drive an agent corresponding to a data analysis function to execute the data analysis function that is the third function.

The driven agent corresponding to the data analysis function may request a web service server 240 to execute the data analysis function by transmitting the converted scan data including the information about the respondent and the information about the response to the questionnaire to the web service server 240 for providing the data analysis service, by using the REST API. The web service server 240 may generate analysis data by analyzing the information included in the converted scan data. The image forming apparatus 100 may receive the analysis data with respect to the questionnaire, which is an execution result of the third function, or information about a location at which the analysis data is stored.

It the data analysis function that is the third function is completely executed, the image forming apparatus 100 may execute a fourth function based on the questionnaire analysis data or the location information of the questionnaire analysis data that is the execution result of the third function. The image forming apparatus 100 may drive an agent corresponding to a message transmission function to execute the message transmission function that is the fourth function.

The driven agent corresponding to the message transmission function may request a web service server 250 to execute the message transmission function by transmitting the questionnaire analysis data or the location information of the questionnaire analysis data to the web service server 250 for providing the message transmission service, by using the REST API. The web service server 250 may transmit a message including the questionnaire analysis data or the location information of the questionnaire analysis data to a contact point preset for the fourth function. The image forming apparatus 100 may receive an execution result of the message transmission function that is the fourth function from the web service server 250 and provide an execution result of the workflow to the user through the UI.

Therefore, the user may quickly receive an analysis result of a questionnaire scanned using the image forming apparatus 100 by using the first workflow consisting of a combination of a plurality of functions.

Figure 10:
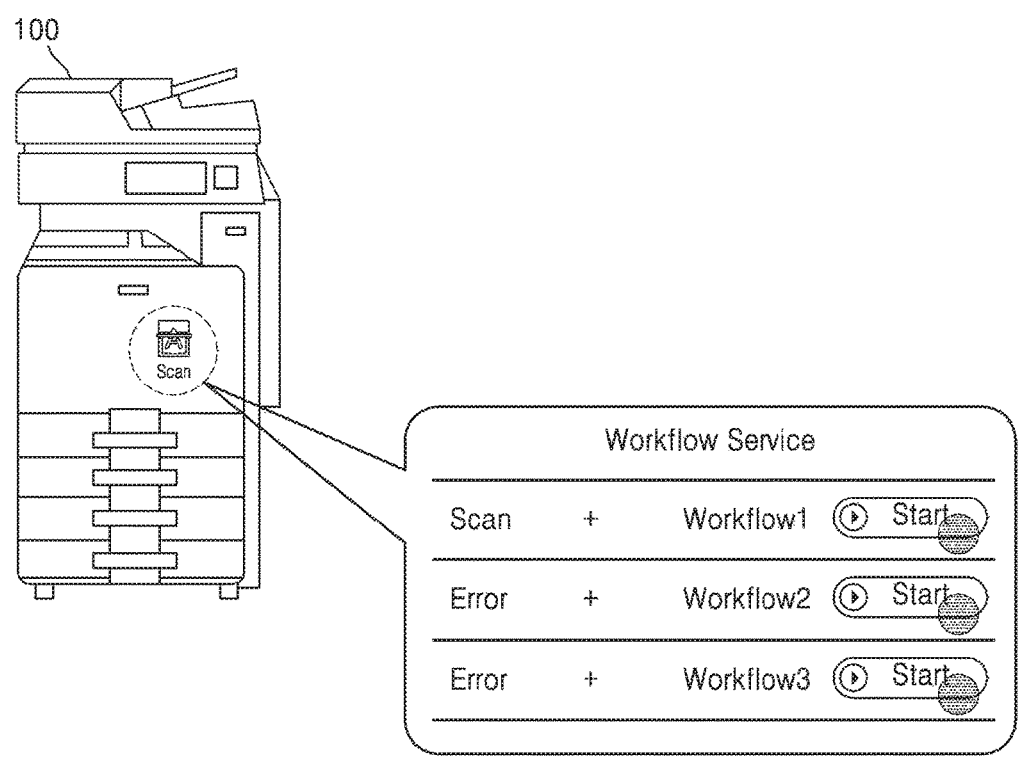
FIG. 10 illustrates a method by which an image forming apparatus provides a workflow service according to an embodiment of the present disclosure.

FIG. 10 illustrates a method by which an image forming apparatus provides a workflow service according to an embodiment of the present disclosure.

Referring to FIG. 10, according to an embodiment of the present disclosure, the image forming apparatus 100 may execute a workflow of an image forming operation according to state information of the image forming apparatus 100 or state information of an operation executed by the image forming apparatus 100.

More particularly, the image forming apparatus 100 may acquire state information of the image forming apparatus 100 and execute a workflow of an image forming operation corresponding to the acquired state information. In this case, the state information of the image forming apparatus 100 is information indicating a current state of the image forming apparatus 100 and may indicate whether an error has occurred, whether consumables lack, whether power is turned on or off, and the like, and the controller 110 may acquire state information of the image forming apparatus 100 by periodically monitoring a state of the image forming apparatus 100.

For example, when an error occurs in the image forming apparatus 100, the image forming apparatus 100 may acquire state information of the occurred error and execute a second workflow or a third workflow corresponding to the state information of the occurred error. In addition, when the error occurs in the image forming apparatus 100, the image forming apparatus 100 may execute both the two workflows (the second workflow and the third workflow) corresponding to the state information of the occurred error. In this case, the second workflow and the third workflow may be executed in a parallel manner. Such a correspondence relationship between state information of the image forming apparatus 100 and workflows of image forming operations may be set by the user.

In addition, the image forming apparatus 100 may acquire state information of an operation executed by the image forming apparatus 100 and execute a workflow of an image forming operation corresponding to the acquired state information. In this case, the state information of an operation is information indicating a current state of an operation executable by the image forming apparatus 100 and may include information about whether the operation is requested, whether the operation is progressed, and the like. For example, the state information of an operation may include information, such as "operation request", "operation waiting", "operation stopping", "operation completion", and "operation reception".

For example, when a scan operation for a document 1 is completed, the image forming apparatus 100 may acquire state information of operation completion with respect to the scan operation and execute a first workflow corresponding to the acquired state information. Such a correspondence relationship between state information of an operation and a workflow of an image forming operation may be set by the user.

Figure 11:
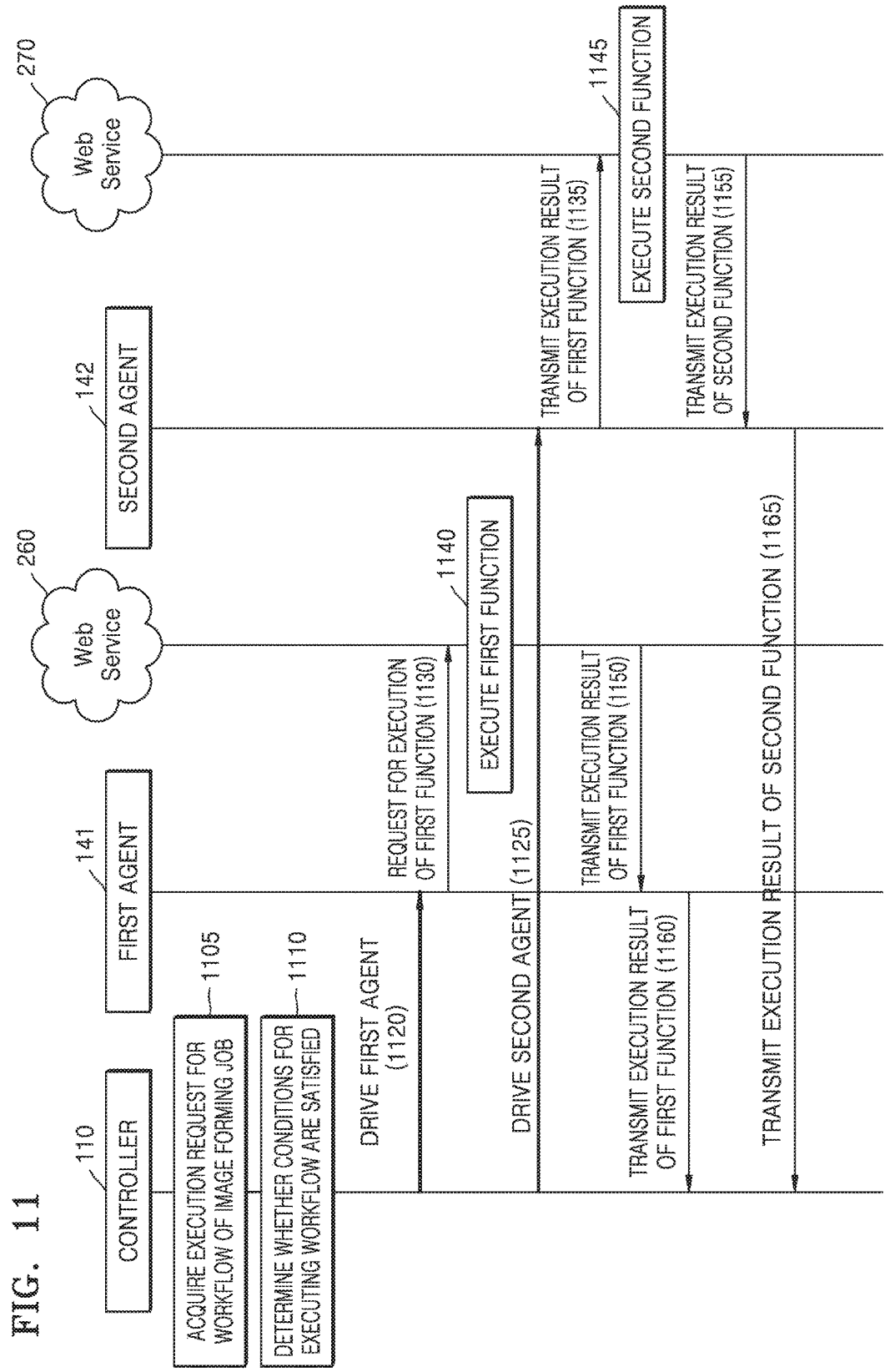
FIG. 11 is a signaling diagram illustrating a method by which an image forming apparatus provides a workflow service according to the embodiment of the present disclosure.

FIG. 11 is a signaling diagram illustrating a method by which an image forming apparatus provides a workflow service according to the embodiment of the present disclosure.

Referring to FIG. 11, the controller 110, the first agent 141, and the second agent 142 of FIG. 11 may be included in the image forming apparatus 100 of FIG. 10.

The image forming apparatus 100 may execute a plurality of workflows corresponding to state information of an occurred error in a parallel manner when the error has occurred in the image forming apparatus 100.

More particularly, in operation 1105, the controller 110 of the image forming apparatus 100 may acquire a request for executing a workflow of an image forming operation. The image forming apparatus 100 may acquire state information of an occurred error when the error has occurred in the image forming apparatus 100 by periodically monitoring a state of the image forming apparatus 100 and determine that an execution request for a workflow corresponding to the state information of the occurred error has been acquired.

In this case, when a plurality of workflows (the second workflow and the third workflow) corresponding to the state information of the occurred error exist, the image forming apparatus 100 may acquire an execution request for the plurality of workflows.

In operation 1110, the image forming apparatus 100 may determine whether all of conditions for respectively executing the plurality of workflows are satisfied.

When all of pre-stored conditions are satisfied, the image forming apparatus 100 may simultaneously execute the plurality of execution-requested workflows in a parallel manner. More particularly, the image forming apparatus 100 may simultaneously execute a first function included in the second workflow and a second function included in the third workflow. For example, the first function may be the message transmission function for transmitting error state information to the user, and the second function may be a VOC function for transmitting data according to an error state to a management system.

In operations 1120 and 1125, the image forming apparatus 100 may simultaneously drive the first agent 141 corresponding to the first function and the second agent 142 corresponding to the second function. In operations 1130 and 1135, the driven first agent 141 may transmit the error state information to a web service server 260 for providing a message service to request for the execution of the first function, and the second agent 142 may transmit the data according to the error state to a web service server 270 for providing a VOC service to request for the execution of the second function.

When the web service server 260 and the web service server 270 execute the first function and the second function in operations 1140 and 1145, respectively, the first agent 141 and the second agent 142 may receive an execution result of the first function and an execution result of the second function in operations 1150 and 1155, respectively. In operations 1160 and 1165, the first agent 141 and the second agent 142 may transmit the execution result of the first function and the execution result of the second function to the controller 110, respectively. The controller 110 may store the execution result of the first function and the execution result of the second function in the image forming apparatus 100 and may provide the execution result of the first function and the execution result of the second function to the user.

Figure 12:
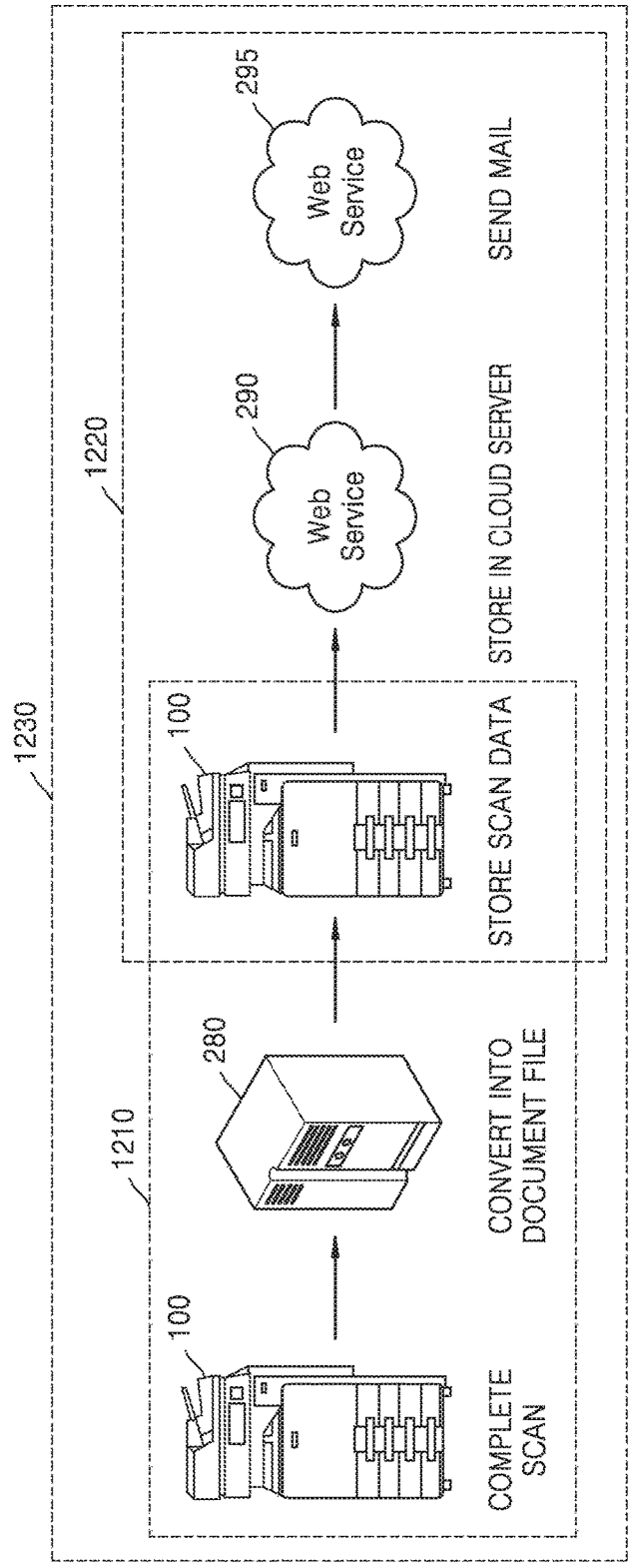
FIG. 12 illustrates a method by which an image forming apparatus provides a workflow service according to an embodiment of the present disclosure.

FIG. 12 illustrates a method by which an image forming apparatus provides a workflow service according to an embodiment of the present disclosure.

Referring to FIG. 12, a user may configure a workflow in which workflows of image forming operations are combined, by using the image forming apparatus 100 according to an embodiment of the present disclosure.

For example, the user may configure a first workflow 1210 including a combination of the scan function on a document, the character recognition function on scan data, and a function of storing the scan data. In addition, the user may configure a second workflow 1220 including a combination of the data storage function, a cloud storage function, and the print function of the image forming apparatus 100. As such, the user may configure a workflow by selecting at least one of functions executable on image forming data.

In this case, the user may configure a new workflow by selecting a plurality of workflows from among workflows pre-stored in the image forming apparatus 100. The image forming apparatus 100 may provide a list of the pre-stored workflows to the user and configure a new workflow by acquiring a user input for selecting a plurality of workflows to be combined as the new workflow.

For example, the user may configure a new third workflow 1230 by selecting the first workflow 1210 and the second workflow 1220 from the list of the pre-stored workflows. In this case, the user may set conditions and various pieces of configuration information for executing each of the first workflow 1210 and the second workflow 1220.

When an execution request for the third workflow 1230 is acquired, the image forming apparatus 100 may scan a document to generate scan data, convert the scan data into a document file by using a server 280 for providing a document recognition service, and store the converted scan data in the image forming apparatus 100. In addition, the image forming apparatus 100 may store the stored scan data in a cloud storage by using a cloud server 290 for providing a cloud storage service, acquire address information of the cloud storage in which the scan data is stored, and send a mail using a web service 295 including the address information to a pre-defined recipient address.

According to an embodiment of the present disclosure, the image forming apparatus 100 may provide a service of configuring a new workflow by combining pre-stored workflows such that the user more easily configures and uses a workflow than before.

Figure 13:
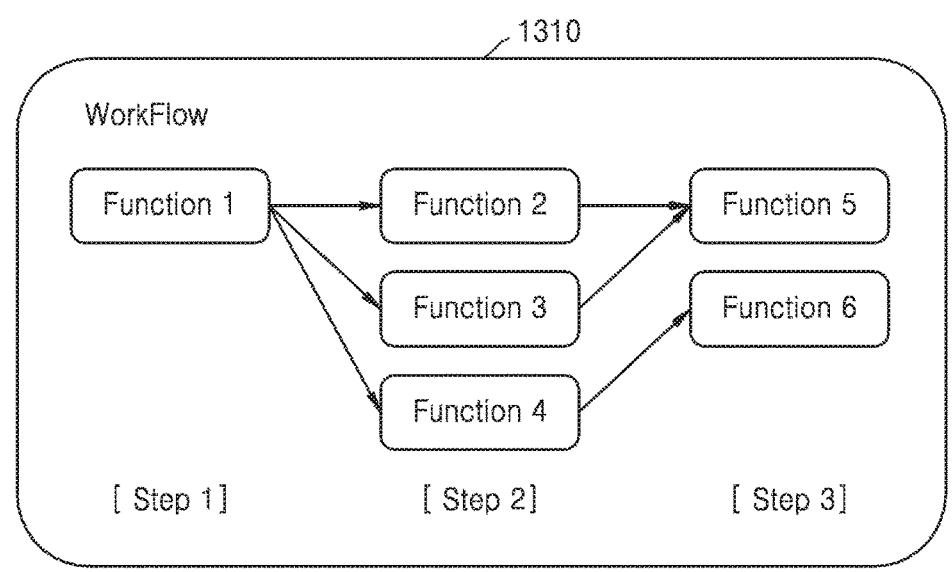
FIG. 13 illustrates a method by which an image forming apparatus provides a workflow service according to an embodiment of the present disclosure.

FIG. 13 illustrates a method by which an image forming apparatus provides a workflow service according to an embodiment of the present disclosure.

Referring to FIG. 13, a user may configure a workflow for executing a plurality of functions in a parallel manner, by using the image forming apparatus 100 according to an embodiment of the present disclosure.

For example, the user may configure a workflow 1310 by combining six (first to sixth) functions.

More particularly, the user may configure a workflow in which the first to sixth functions are sequentially executed or the workflow 1310 in which some of the first to sixth functions are executed in a parallel manner.

Referring to the workflow 1310, when an execution request for the workflow 1310 is acquired, the image forming apparatus 100 may execute the first function by driving a first agent corresponding to the first function. When the first function is completely executed, the image forming apparatus 100 may simultaneously drive second, third, and fourth agents to execute the second, third, and fourth functions in a parallel manner. In this case, the second, third, and fourth functions may be executed in a parallel manner based on an execution result of the first function.

When the second and third functions are completely executed, the image forming apparatus 100 may drive a fifth agent to execute the fifth function. The fifth function may be executed based on an execution result of the second function and an execution result of the third function. In addition, when the fourth function is completely executed, the image forming apparatus 100 may drive a sixth agent to execute the sixth function in parallel to the execution of the fifth function. The sixth function may be executed based on an execution result of the fourth function.

The image forming apparatus 100 may provide an execution result of the workflow 1310 based on an execution result of the fifth function and an execution result of the sixth function.

According to an embodiment of the present disclosure, the image forming apparatus 100 may provide a workflow in which a plurality of functions are organically combined so as to be executed in a parallel or series manner such that the user uses more various workflows of image forming operations than before.

Figure 14:
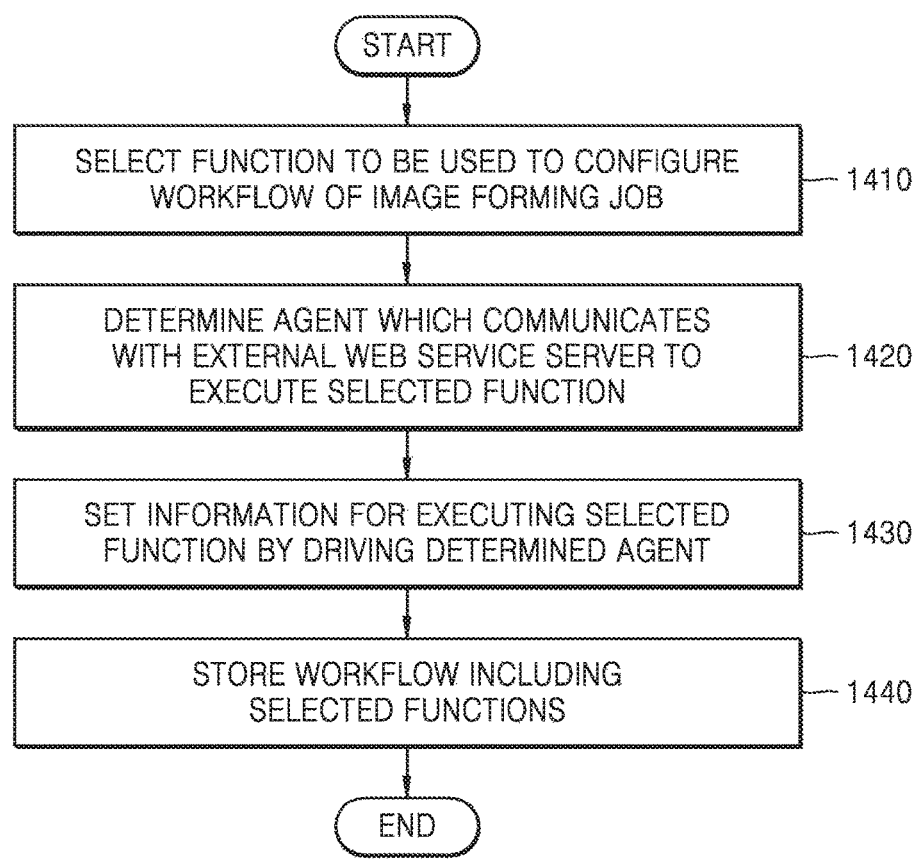
FIG. 14 is a flowchart of a method of configuring a workflow of an image forming operation in an image forming apparatus according to an embodiment of the present disclosure.

FIG. 14 is a flowchart of a method of configuring a workflow of an image forming operation in an image forming apparatus according to an embodiment of the present disclosure.

According to an embodiment of the present disclosure, a user may configure a workflow of an image forming operation in the image forming apparatus 100 by using the UI of the image forming apparatus 100 in order to receive the workflow service.

Referring to FIG. 14, in operation 1410, the image forming apparatus 100 may select a function to be included in a workflow of an image forming operation.

For example, the image forming apparatus 100 may provide a list of executable functions with respect to image forming data to the user through the UI and acquire a user input for selecting at least one function from the user.

In operation 1420, the image forming apparatus 100 may determine an agent corresponding to the selected function, which is configured to communicate with an external web service server to execute the selected function.

In operation 1430, the image forming apparatus 100 may drive the determined agent to set information for executing the selected function. For example, the image forming apparatus 100 may provide, to the user, items of information, such as necessary input data for executing the selected function or conditions for the execution by using the determined agent and acquire the information, such as the necessary input data or the conditions for the execution from the user. When the selected function is a function to be executed using an external web service server, the image forming apparatus 100 may receive the items of the information, such as the necessary input data or the conditions for the execution from the external web service server by using the determined agent.

In operation 1440, the image forming apparatus 100 may store a workflow including selected functions. More particularly, the image forming apparatus 100 may store information, such as conditions for executing a workflow of an image forming operation and the working contents and an execution order of functions constituting the pre-configured workflow of the image forming operation. The image forming apparatus 100 may also store a workflow of an image forming operation in correspondence with user identification information that is the user's unique information.

Figure 15:
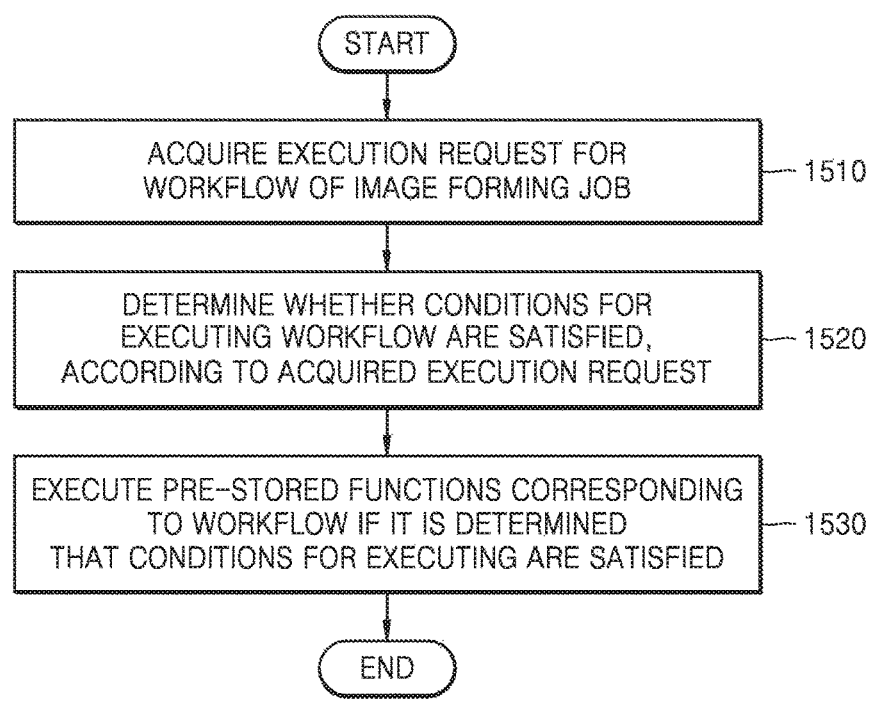
FIG. 15 is a flowchart of a method by which an image forming apparatus provides a workflow service according to an embodiment of the present disclosure.

FIG. 15 is a flowchart of a method by which an image forming apparatus provides a workflow service according to an embodiment of the present disclosure.

According to an embodiment of the present disclosure, a user may easily use functions of various image forming operations by using the workflow service provided by the image forming apparatus 100.

Referring to FIG. 15, in operation 1510, the image forming apparatus 100 may acquire an execution request for a workflow of an image forming operation. For example, the image forming apparatus 100 may acquire an execution request for a first workflow from the user through the UI. According to an embodiment of the present disclosure, the first workflow may include a combination of a first function and a second function.

Alternatively, the image forming apparatus 100 may acquire state information of the image forming apparatus 100 to automatically acquire an execution request for the first workflow corresponding to the acquired state information.

In operation 1520, the image forming apparatus 100 may determine whether conditions for executing the workflow are satisfied, according to the acquired execution request.

The conditions for executing the workflow are necessary conditions which have to be satisfied to execute the workflow and may be, for example, conditions set by the user when the workflow of the image forming operation is configured. Alternatively, the conditions for executing the workflow may be conditions on whether input data of functions corresponding to the corresponding workflow has been acquired and whether the user has acquired use right of the corresponding workflow. Alternatively, the conditions for executing the workflow may be conditions for executing functions corresponding to the workflow, and a condition for executing each of the functions may be a condition on whether another function supposed to be previously executed has been completed.

The image forming apparatus 100 may determine whether a condition for executing a first function, which is pre-stored in correspondence with the first function, is satisfied, to execute the first function and may determine whether a condition for executing a second function, which is pre-stored in correspondence with the second function, is satisfied, to execute the second function. For example, the pre-stored execution condition corresponding to the second function may be whether the first function is completely executed.

In operation 1530, the image forming apparatus 100 may execute pre-stored functions corresponding to the execution-requested workflow if it is determined that pre-stored conditions are satisfied.

According to an embodiment of the present disclosure, the pre-stored functions corresponding to the first workflow may be the first function and the second function.

The image forming apparatus 100 may execute the first function by driving a first agent corresponding to the first function when it is determined that the condition for executing the first function is satisfied. When the first function is a web service to be executed using an external server, the driven first agent may acquire an execution result of the first function from a web service server by using the REST API.

When the execution result of the first function is acquired, the image forming apparatus 100 may determine whether the condition for executing the second function is satisfied and drive a second agent corresponding to the second function. For example, the pre-stored execution condition corresponding to the second function may be whether the first function is completely executed. The second function may be executed based on the execution result of the first function. When the second function is a web service to be executed using an external server, the driven second agent may acquire an execution result of the second function from a web service server by using the REST API.

The image forming apparatus 100 may acquire and store the execution result of the second function and provide information about whether the workflow is completely executed to the user through the UI.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for providing a workflow service by an image forming apparatus, the method comprising:

acquiring, by the image forming apparatus, an execution request for a workflow of an image forming operation;

determining, by the image forming apparatus, whether at least one condition for executing the workflow is satisfied, according to the acquired execution request;

determining, by the image forming apparatus, whether at least one condition for automatically initiating execution of a second pre-stored function of the workflow in parallel with at least a third pre-stored function is satisfied, according to the acquired execution request and state information of the image forming apparatus; and automatically initiating execution, by the image forming apparatus, of the second pre-stored function of the workflow in parallel with the third pre-stored function, if the at least one condition for the automatic initiation of parallel execution is satisfied, wherein the at least one condition for the automatic initiation of parallel execution comprises execution of a first pre-stored function by driving an agent for the first pre-stored function and receiving an execution result of the first pre-stored function, wherein the automatically initiating execution of second and third pre-stored functions of the workflow comprises:

driving an agent for the second pre-stored function corresponding to the workflow of the image forming operation based on the execution result of the first pre-stored function; and driving an agent for the third pre-stored function corresponding to the workflow of the image forming operation based on the execution result of the first pre-stored function, wherein the driving of the agent for the second pre-stored function comprises:

requesting an external web service server to execute the second pre-stored 'function, based on a representational state transfer (REST) application programming interface (API); and receiving an execution result of the second pre-stored function from the external web service server for executing the second pre-stored function, wherein the driving of the agent for the third pre-stored function comprises:

requesting the external web service server to execute the third pre-stored function based on the REST API; and receiving an execution result of the third pre-stored function from the external web service server for executing the third pre-stored function, wherein the second pre-stored function comprises a message transmission function for transmitting error state information to a user, and wherein the third pre-stored function comprises a voice of customer (VOC) function for transmitting data according to an error state to a management system.

2. The method of claim 1, wherein the determining of whether the at least one condition for executing the workflow is satisfied comprises determining whether input data required to execute the second and third pre-stored functions corresponding to the workflow has been acquired.

3. The method of claim 1, wherein the determining of whether the at least one condition for executing the workflow is satisfied comprises determining whether the first pre-stored function is completely executed in order to execute either of the second or third pre-stored functions corresponding to the workflow.

4. The method of claim 1, wherein the acquiring of the execution request for the workflow of the image forming operation comprises:

providing workflows of a plurality of image forming operations stored in the image forming apparatus to the user through a user interface (UI) of the image forming apparatus; and acquiring a user input for selecting any one workflow to be executed from among the provided workflows of the plurality of image forming operations.

5. The method of claim 4, wherein the providing of the workflows of the plurality of image forming operations stored in the image forming apparatus comprises:

acquiring user identification information from the user;

acquiring the workflows of the plurality of image forming operations corresponding to the acquired user identification information; and displaying the acquired workflows of the plurality of image forming operations on a user interface (UI) of the image forming apparatus.

6. The method of claim 1, wherein the acquiring of the execution request for the workflow of the image forming operation comprises:

acquiring the state information of the image forming apparatus by monitoring a state of the image forming apparatus; and selecting a workflow of an image forming operation corresponding to the state information of the image forming apparatus.

7. An image forming apparatus for providing a workflow service, the image forming apparatus comprising:

a memory to store conditions for executing the workflow and information about pre-stored functions corresponding to the workflow; and at least one processor to:

acquire an execution request for a workflow of an image forming operation, determine whether at least one condition for executing the workflow is satisfied, according to the acquired execution request, determine whether at least one condition for automatically initiating execution of a second pre-stored function of the workflow in parallel with a third pre-stored function is satisfied, according to the acquired execution request and state information of the image forming apparatus, and automatically initiate execution of the second pre-stored function of the workflow in parallel with the third re-stored function, if the at least one condition for the automatic initiation of parallel execution is satisfied, wherein the at least one condition for the automatic initiation of parallel execution comprises execution of a first pre-stored function by driving an agent for the first pre-stored function and receiving an execution result of the first pre-stored function, wherein, to automatically initiate execution of second and third pre-stored functions, the at least one processor:

executes a second function agent that executes the second pre-stored function corresponding to the workflow of the image forming operation based on the execution result of the first pre-stored function, and executes a third function agent that executes the third pre-stored function corresponding to the workflow of the image forming operation based on an execution result of the first pre-stored function, wherein the second function agent:

requests an external web service server to execute the second pre-stored function, based on a representational state transfer (REST) application programming interface (API), and receives an execution result of the second pre-stored function from the external web service server for executing the second pre-stored function, wherein the third function agent:

requests the external web service server to execute the third pre-stored function based on the REST API, and receives an execution result of the third pre-stored function from the external web service server for executing the third pre-stored function, wherein the second pre-stored function comprises a message transmission function for transmitting error state information to a user, and wherein the third pre-stored function comprises a voice of customer (VOC) function for transmitting data according to an error state to a management system.

8. The image forming apparatus of claim 7, wherein the at least one processor determines whether the at least one condition is satisfied by determining whether input data required to execute the second and third pre-stored functions corresponding to the workflow has been acquired.

9. The image forming apparatus of claim 7, wherein the at least one processor determines whether the at least one condition is satisfied by determining whether a first pre-stored function is completely executed in order to execute either of the second or third pre-stored functions corresponding to the workflow.

10. The image forming apparatus of claim 7, further comprising a user interface (UI) to:

provide workflows of a plurality of image forming operations stored in the image forming apparatus, and acquire a user input for selecting any one workflow to be executed from among the provided workflows of the plurality of image forming operations.

11. The image forming apparatus of claim 10, wherein the UI:
    acquires user identification information from the user, and
    displays workflows of a plurality of image forming operations corresponding to the acquired user identification information.

12. The image forming apparatus of claim 7, wherein the at least one processor:
    acquires the state information of the image forming apparatus by monitoring a state of the image forming apparatus, and
    acquires an execution request for a workflow of an image forming operation corresponding to the state information of the image forming apparatus.

13. At least one non-transitory computer-readable storage medium having stored thereon instructions, readable by at least one processor, for providing a workflow service by an image forming apparatus, the storage medium comprising:
    instructions to acquire, by the image forming apparatus, an execution request for a workflow of an image forming operation;
    instructions to determine, by the image forming apparatus, whether at least one condition for executing the workflow is satisfied, according to the acquired execution request;
    instructions to determine, by the image forming apparatus, whether at least one condition for automatically initiating execution of a second pre-stored function of the workflow in parallel with a third pre-stored function is satisfied, according to the acquired execution request and state information of the image forming apparatus; and
    instructions to automatically initiate execution, by the image forming apparatus, of the second pre-stored function of the workflow in parallel with the third pre-stored function, if the at least one condition for the automatic initiation of parallel execution is satisfied,
    wherein the at least one condition for the automatic initiation of parallel execution comprises execution of a first pre-stored function by driving an agent for the first pre-stored function and receiving an execution result of the first pre-stored function,
    wherein, the instructions to automatically initiate execution of second and third pre-stored functions include instructions to:
    execute a second function agent that executes the second pre-stored function corresponding to the workflow of the image forming operation based on the execution result of the first pre-stored function, and
    execute a third function agent that executes the third pre-stored function corresponding to the workflow of the image forming operation based on the execution result of the first pre-stored function,
    wherein the second function agent:
    requests an external web service server to execute the second pre-stored function, based on a representational state transfer (REST) application programming interface (API), and
    receives an execution result of the second pre-stored function from the external web service server for executing the second pre-stored function,
    wherein the third function agent:
    requests the external web service server to execute the third pre-stored function based on the REST API, and
    receives an execution result of the third pre-stored function from the external web service server for executing the third pre-stored function,
    wherein the second pre-stored function comprises a message transmission function for transmitting error state information to a user, and
    wherein the third pre-stored function comprises a voice of customer (VOC) function for transmitting data according to an error state to a management system.

* * * * *

UNITED STATES PATENT AND TRADEMARK OFFICE
CERTIFICATE OF CORRECTION

PATENT NO. : 10,205,843 B2
APPLICATION NO. : 15/290682
DATED : February 12, 2019
INVENTOR(S) : Jung-hun Kim et al.

Page 1 of 1

It is certified that error appears in the above-identified patent and that said Letters Patent is hereby corrected as shown below:

In the Drawings

In sheet 1 of 15, reference numeral 210, Line 3, delete "Hight:" and insert -- High: --, therefor.

In sheet 3 of 15, reference numeral 302, Line 6, delete "sebject:" and insert -- subject: --, therefor.

In the Claims

In Column 24, Line 14, in Claim 7, delete "re-stored" and insert -- pre-stored --, therefor.

Signed and Sealed this
Seventh Day of May, 2019

Andrei Iancu
*Director of the United States Patent and Trademark Office*